3,443,957
ARABINOGALACTAN AS AN IMPROVER OF BEER FOAM ADHESION

Edward Segel and Paul R. Glenister, Chicago, Ill., assignors to J. E. Siebel Sons Company, Inc., Chicago, Ill., a corporation of Illinois
No Drawing. Filed Sept. 12, 1966, Ser. No. 578,496
Int. Cl. C12h 1/00
U.S. Cl. 99—48                    10 Claims

ABSTRACT OF THE DISCLOSURE

The foam adhesion of carbonated alcoholic malt beverages is improved by dissolving in the beverage arabinogalactan alone or in combination with a heptyl ester of p-hydroxybenzoic acid.

---

This invention relates to the improvement in appearance of carbonated alcoholic beverages derived from malt.

More specifically, it relates to the adhesion to glass of the foam of beverages such as beer, ale, and so-called "near beer," and to improvement in the appearance of a glass containing such a beverage after the head of foam has collapsed. In the present specification, the word "beer" is used to include the entire class of carbonated alcoholic and non-alcoholic malt beverages.

When a carbonated malt beverage, as beer, is poured into a glass, a head of foam forms which gradually subsides. This head of foam has aesthetic appeal to the consumer. It is highly desirable that the foam be long-lived and attractive in appearance. The improvement of the appearance of a glass of beer by enhancement of foam stability is of sufficient commercial importance that considerable effort has been expended to find materials which, when added to beer, increase its foam stability.

However, foam stability is not the only factor which contributed to the aesthetic appeal of a glass of beer to the consumer. Among other important factors is the quality known as foam adhesion, or "cling." Foam adhesion, or cling, is the material deposited on the wall of the drinking glass as beer foam collapses. This deposit is generally in the form of a network which may vary from a scanty, almost non-existent irregular webbing to a uniform heavy lacework.

The existence of this network is characteristic of and almost exclusive to beer. Beers with scanty clings are viewed by those skilled in the art as being deficient in some constituent, while a beer which exhibits a dense, uniform lacework has great appeal and is considered satisfactorily balanced in its components.

Variation in cling is found not only among different brands of beer, but in different batches of beer made in the same brewery. One of the aims of a brewer is to produce consistently a beer which gives excellent cling. This goal is not easy to attain. Although a number of beer "foam stabilizers" are known, the problem of foam stabilization is entirely distinct from and not necessarily related to the problem of cling.

Detergents often have a harmful effect on cling, converting a beer with normal cling to a beer with little or no cling. Since traces of detergents may be introduced inadvertently into beer, either as a residue from cleaning procedures in the brewery, or by incomplete rinsing of glasses used by the consumer, a material which would inhibit this harmful effect of detergents is highly desirable.

The heptyl ester of para-hydroxybenzoic acid, which is useful as a chemical preservative for beer, has a profound and harmful effect on the cling of beer. Available foam stabilizers are ineffective in correcting this deleterious effect.

An object of this invention is to improve cling in any carbonated malt beverage.

Another object is to enhance cling where this property is deficient in a beer.

Another object of this invention is to produce a beer more pleasing to the consumer, in that the residue left on the drinking glass after the head of foam has collapsed is more attractive in appearance.

Still another object is to produce a beer whose cling is resistant to the deleterious effect of detergents.

Yet another object of this invention is to produce a beer whose cling is resistant to the deleterious effect of the heptyl ester of para-hydroxybenzoic acid.

Other objects and advantages of this invention and the details thereof will appear hereinafter.

We have found that arabinogalactan, which can be obtained by extraction from timber of the giant Western Larch tree, has a beneficial effect on the cling of beer. Arabinogalactan is a unique water soluble polysaccharide. It is available commercially and is non-toxic. It is a complex, highly branched polymer of arabinose and galactose in the ratio of about 1:6 respectively.

Arabinogalactan is a white powder readily soluble in either cold or hot water. It can conveniently be introduced into beer as an aqueous solution, either as the beer is transferred out of fermentation, in the cellar, or at any other convenient stage prior to packaging, in the brewing process.

Addition of arabinogalactan in minute amounts to beer improves the cling of the beer so treated. Comparison of identical glasses of beer, poured in the same manner, varying only in that one glass contains beer treated with arabinogalactan whereas the other contains untreated beer, demonstrates the improved cling brought about by the use of arabinogalactan.

Frequently, attempts to eliminate the costly pasteurization of beer by use of the chemical preservative, heptyl ester of p-hydroxybenzoic acid, results in a beer with such deficient cling as to discourage the brewer from the use of this preservative. It has been found that the combined use of arabinogalactan and the heptyl ester of p-hydroxybenzoic acid gives a sterile beer with a copious cling, completely acceptable commercially. A mixture of arabinogalactan and the heptyl p-hydroxybenzoate, preferably in propylene glycol, can be added to the finished beer just prior to packaging. In such mixtures, the ratio of arabinogalactan to heptyl-p-hydroxybenzoate may range from about 1:2 to about 10:1, dependent on the amount of cling improvement needed for the particular beer.

The amount of arabinogalactan required in a particular use will depend in part on the degree of improvement of cling desired, and in part on the particular beer used. One skilled in the art can readily select a concentration for a particular beer to give the effect required.

For most purposes, the desired concentration of arabinogalactan in beer lies in the range of 10–80 p.p.m. In some cases, noticeable improvement can be observed at as low a concentration as 5 p.p.m. For special purposes, higher concentrations, such as up to about 200 p.p.m., may be desirable, though usually sufficient improvement is obtained at 80 p.p.m. as not to require the use of higher concentrations.

If a mixture of arabinogalactan and the heptyl ester of para hydroxybenzoic acid is to be added to beer, it is usually desired to obtain a concentration of about 10–12 p.p.m. of the latter compound. If one wishes to have, for example, 40 p.p.m. arabinogalactan in beer treated with such a mixture, a mixture of 4 parts arabinogalactan to one part heptyl p-hydroxybenzoate is suitable.

The following examples illustrate the use of arabinogalactan and of a mixture of arabinogalactan and the heptyl-ester of p-hydroxybenzoic acid in carbonated malt beverages, but in no way limit the invention. In these examples, the clings are judged in quality as either poor, fair, fairly good, good, very good, or excellent.

EXAMPLE I

A 2% aqueous solution of arabinogalactan was added to beer A prior to final filtration. The concentration of arabinogalactan in the beer was 80 p.p.m. The cling of the finished, packaged beer was very good. The cling of the same beer under identical conditions but without the addition of arabinogalactan was fair.

EXAMPLE II

A 4% aqueous solution of arabinogalactan was added to finished beer B. The concentration of arabinogalactan in the beer was 40 p.p.m. The cling of the beer was excellent. The cling of the same beer under identical conditions but without the addition of arabinogalactan was very poor.

EXAMPLE III

A mixture of equal parts of arbinogalactan and the heptyl ester of p-hydroxybenzoic acid was slurried in propylene glycol so that the total solids in the propylene glycol was 1%. The slurry was added to beer C in the government cellar, so that the concentration of both arabinogalactan and the heptyl ester of p-hydroxybenzoic acid in the beer was 10 p.p.m. The finished beer cling was good. The cling of the same beer under identical conditions but containing 10 p.p.m. heptyl ester of p-hydroxybenzoic acid but without arabinogalactan was fair.

EXAMPLE IV

A mixture of 10 parts arabinogalactan and 1 part of the heptyl ester of p-hydroxybenzoic acid was slurried in propylene glycol so that the total solids in the propylene glycol was 2%. The slurry was added to beer D in the government cellar, so that the concentration of arabinogalactan was 100 p.p.m. and the heptyl ester of p-hydroxybenzoic acid was 10 p.p.m. in the beer. The finished beer cling was very good. The cling of the same beer under identical conditions containing 10 p.p.m. heptyl ester of p-hydroxybenzoic acid but without arabinogalactan was poor.

EXAMPLE V

Beer E contained 1 p.p.m. of a detergent (sulfamine–50, which is the neutral triethanolamine salt of dodecylbenzene sulfonic acid) known to destroy cling. Its cling was poor. A 2% solution of arabinogalactan was added to beer E so that the final concentration of arabinogalactan was 80 p.p.m. The cling of such treated beer was good.

We claim:
1. The method of improving the cling in carbonated alcoholic malt beverages which comprises dissolving therein arabinogalactan.
2. The method of claim 1 wherein the beverage is beer.
3. The method of claim 2 wherein the arabinogalactan is added to the beer prior to packaging.
4. The method of claim 1 wherein the arabinogalactan is in the amount of from about 10 to about 80 parts per million by weight of the beverage.
5. The method of claim 1 wherein heptyl ester of p-hydroxybenzoic acid is further dissolved in the beverage.
6. The method of claim 5 wherein the heptyl ester of p-hydroxybenzoic acid is in the amount of from about 10 to about 12 parts per million.
7. The method of claim 5 wherein the heptyl ester of p-hydroxybenzoic acid and the arabinogalactan are pre-slurried in propylene glycol before addition to the beverage.
8. Beer containing from about 10 to about 80 parts per million of arabinogalactan.
9. The beer of claim 8 further containing from about 10 to about 12 parts per milion of the heptyl ester of p-hydroxybenzoic acid.
10. A composition for improving the cling of beer comprising arabinogalactan and the heptyl ester of p-hydroxybenzoic acid in the proportions of from about 1:2 to about 10:1.

References Cited

UNITED STATES PATENTS

| | | | |
|---|---|---|---|
| 2,943,942 | 7/1960 | Segel | 99—48 |
| 3,051,574 | 8/1962 | Segel | 99—48 |
| 3,232,766 | 2/1966 | Strandskov et al. | 99—48 |
| 3,294,544 | 12/1966 | Stanko | 99—79 |

A. LOUIS MONACELL, *Primary Examiner.*

D. M. NAFF, *Assistant Examiner.*

U.S. Cl. X.R.

99—32, 49, 79